(12) United States Patent
Lagergren et al.

(10) Patent No.: US 8,776,053 B2
(45) Date of Patent: Jul. 8, 2014

(54) SYSTEM AND METHOD TO RECONFIGURE A VIRTUAL MACHINE IMAGE SUITABLE FOR CLOUD DEPLOYMENT

(75) Inventors: Marcus Lagergren, Lidingo (SE); Mikael Vidstedt, Solna (SE)

(73) Assignee: Oracle International Corporation, Redwood Shores, CA (US)

( * ) Notice: Subject to any disclaimer, the term of this patent is extended or adjusted under 35 U.S.C. 154(b) by 199 days.

(21) Appl. No.: 12/853,053

(22) Filed: Aug. 9, 2010

(65) Prior Publication Data
US 2011/0078680 A1 Mar. 31, 2011

Related U.S. Application Data

(60) Provisional application No. 61/246,050, filed on Sep. 25, 2009.

(51) Int. Cl.
G06F 9/455 (2006.01)
G06F 9/44 (2006.01)

(52) U.S. Cl.
USPC .............................................. 718/1; 717/168

(58) Field of Classification Search
USPC .............................................. 717/168; 718/1
See application file for complete search history.

(56) References Cited

U.S. PATENT DOCUMENTS

| 7,080,378 | B1 | 7/2006 | Noland |
|---|---|---|---|
| 7,293,168 | B2 | 11/2007 | Maeda |
| 8,156,301 | B1 | 4/2012 | Khandelwal |
| 8,176,486 | B2 | 5/2012 | Husain |
| 8,219,653 | B1 | 7/2012 | Keagy et al. |
| 8,321,558 | B1 | 11/2012 | Sirota |
| 8,381,264 | B1 * | 2/2013 | Corddry et al. ................... 726/3 |
| 8,458,717 | B1 | 6/2013 | Keagy |
| 8,468,535 | B1 | 6/2013 | Keagy |
| 2003/0217131 | A1 | 11/2003 | Hodge |
| 2005/0198303 | A1 * | 9/2005 | Knauerhase et al. ......... 709/227 |
| 2007/0033586 | A1 * | 2/2007 | Hirsave et al. ................ 717/174 |
| 2007/0294676 | A1 | 12/2007 | Mellor |
| 2007/0300205 | A1 * | 12/2007 | Scian et al. ................... 717/106 |
| 2008/0059556 | A1 | 3/2008 | Greenspan |
| 2008/0201414 | A1 | 8/2008 | Husain |

(Continued)

FOREIGN PATENT DOCUMENTS

EP 2019358 1/2009

OTHER PUBLICATIONS

International Search Report dated Nov. 30, 2010 in re: PCT/US2010/036732, 11 pages.

(Continued)

*Primary Examiner* — Sujay Koneru
(74) *Attorney, Agent, or Firm* — Meyer IP Law Group

(57) ABSTRACT

A system and method for reconfiguring a virtual server image suitable for cloud deployment. In accordance with an embodiment, the system comprises providing a virtual server image, which can be executed on one or a plurality of hypervisors, and which contains a bootable part of a virtual machine, a non-bootable part of the virtual machine, a software application code for a software application, and a software application data for the software application. Information in a virtual server image patch can be used to reconfigure the contents of the virtual server image from its original content to a reconfigured content, to create a reconfigured virtual server image. In a particular embodiment, the virtual machine can be a Java Virtual Machine.

15 Claims, 5 Drawing Sheets

(56) References Cited

U.S. PATENT DOCUMENTS

| | | |
|---|---|---|
| 2008/0263258 A1 | 10/2008 | Allwell |
| 2008/0271016 A1 | 10/2008 | Chess et al. |
| 2008/0295092 A1* | 11/2008 | Tan et al. .................. 717/178 |
| 2009/0006534 A1 | 1/2009 | Fries et al. |
| 2009/0036111 A1* | 2/2009 | Danford et al. ............. 455/419 |
| 2009/0070752 A1 | 3/2009 | Alpern et al. |
| 2009/0100420 A1* | 4/2009 | Sapuntzakis et al. ......... 717/171 |
| 2009/0113423 A1 | 4/2009 | Hiltgen |
| 2009/0164994 A1* | 6/2009 | Vasilevsky et al. ............... 718/1 |
| 2009/0172662 A1* | 7/2009 | Liu ................................. 718/1 |
| 2009/0276771 A1 | 11/2009 | Nickolov et al. |
| 2010/0027552 A1* | 2/2010 | Hill ................................ 370/401 |
| 2010/0070970 A1* | 3/2010 | Hu et al. ............................ 718/1 |
| 2010/0162238 A1* | 6/2010 | Warfield ............................ 718/1 |
| 2010/0287280 A1* | 11/2010 | Sivan ............................. 709/226 |

OTHER PUBLICATIONS

Krsul, et al., "VMPlants: Providing and Managing Virtual Machine Execution Environments for Grid Computing", Proceedings of the ACM/IEEE SC2004 Conference Pittsburgh, PA, USA, 2004, 12 pages.

* cited by examiner

SYSTEM AND METHOD TO RECONFIGURE A VIRTUAL MACHINE IMAGE SUITABLE FOR CLOUD DEPLOYMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims the benefit of priority to U.S. Provisional Patent Application No. 61/246,050, titled "SYSTEM AND METHOD TO RECONFIGURE A VIRTUAL MACHINE IMAGE SUITABLE FOR CLOUD DEPLOYMENT", filed Sep. 25, 2009; and is related to U.S. patent application Ser. No. 12/476,103, titled "SYSTEM AND METHOD FOR CONVERTING A JAVA APPLICATION INTO A VIRTUAL SERVER IMAGE FOR CLOUD DEPLOYMENT", filed Jun. 1, 2009; each of which applications are herein incorporated by reference.

FIELD OF INVENTION

The invention is generally related to application servers and virtual machines, and particularly to a system and method to reconfigure a virtual machine image comprising a Java Virtual Machine and a Java application, suitable for cloud deployment.

BACKGROUND

Cloud computing is generally defined as a form of computing in which dynamic and/or virtualized resources are provided as services over a distributed network of physical computing machines or servers, such as the Internet. Client processes, software applications, and users thereof, are not required to have explicit knowledge or control over the technology infrastructure within the cloud. Instead, they can request or call upon services from the cloud, which are then provided by other providers within the cloud. As such, cloud computing promises software application developers with an easy means way of deploying their application to run simultaneously upon thousands of servers in a cloud.

To date, different solutions of deploying software applications in a cloud have emerged that are generally cloud specific, i.e. the applications need to conform to a cloud/hypervisor specific application program interface (API) to run on their servers. Using this methodology, it is not easy for a cloud customer to migrate an application from one cloud provider to another cloud provider. Cloud providers can address this problem somewhat by offering hypervisors in their clouds. Generally, a hypervisor acts as a layer between a server's hardware and its operating system. This provides an abstraction layer that allows each physical server to run one or more virtual servers, and effectively decouples the operating system and its applications from the underlying physical server. When used in a cloud, the cloud customer can supply a virtual machine image which contains the customer application to the hypervisor. The image will then be booted in potentially thousands of hypervisors in the cloud. Since there are generally only a few hypervisor types this approach standardizes the format for how the application developer has to package the application. Instead of creating a standalone application that fits into a specific cloud API, the developer now has to create a suitable virtual machine image.

However, such a created virtual machine image can be large, depending on the Java application contained therein. The image can also grow in size when the virtual machine image is executed. For example, application generated data and log files can be stored within the image, and such an image can grow to several gigabytes in size. Since it is usually unavoidable that the Java application or the Java virtual machine (JVM) contained within the virtual machine image will have to be updated there is a need for a tool that can efficiently update such a virtual server image and do so without disturbing the accumulated application data.

SUMMARY

Disclosed herein is a system and method that can be used to reconfigure a virtual server image comprising a Java virtual machine and a Java application, that is suitable for cloud deployment. In accordance with an embodiment, the system and method allows for updating a Java virtual machine and its configuration, inside a virtual server image. In accordance with another embodiment, the Java virtual machine is bootable and comprises a minimal operating system suitable only to run a single Java virtual machine instance. In accordance with another embodiment, the system and method allows for updating the Java application within the virtual server image. In particular, the virtual server image can be compatible with any hypervisor for server virtualization and the application virtual machine can be a Java Virtual Machine (JVM) or any other virtual machine for running software applications.

In accordance with an embodiment, the system includes a virtual server image updater, that allows the system to take a virtual server image and reconfigure it according to a specification within a virtual server image patch. The reconfigured virtual server image can then be deployed in a hypervisor, or for example within a cloud of hypervisors. In accordance with another embodiment the virtual server image patch is distributed to the computers within a cloud and applied locally on each computer. In another embodiment the Java application is suspended, followed by a shutdown of the virtual server image, the virtual server image is then patched, and finally the virtual server is booted and the Java application resumed.

In accordance with an embodiment, the updater will create an inverse virtual server image patch that, when applied to the reconfigured virtual server image, will restore it to its original state.

DETAILED DESCRIPTION

Figure 1:
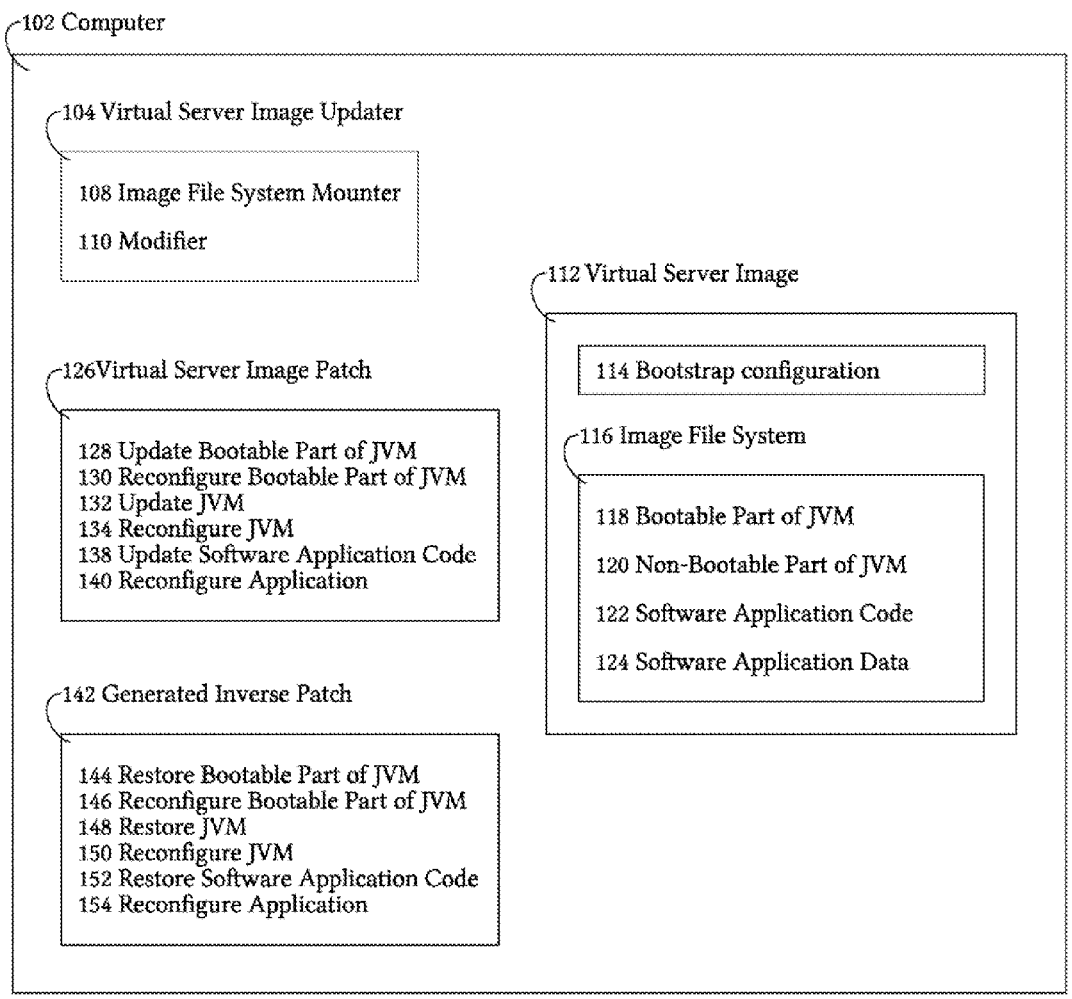
FIG. 1 shows an illustration of a system in accordance with an embodiment.

Disclosed herein is a system and method that can be used to reconfigure a virtual server image comprising a Java virtual machine and a Java application, that is suitable for cloud deployment. In accordance with an embodiment, the system and method allows for updating a Java virtual machine and its configuration, inside a virtual server image. In accordance with another embodiment, the Java virtual machine is bootable and comprises a minimal operating system suitable only to run a single Java virtual machine instance. In accordance with another embodiment, the system and method allows for updating the Java application within the virtual server image. In particular, the virtual server image can be compatible with any hypervisor for server virtualization and the application virtual machine can be a Java Virtual Machine (JVM) or any other virtual machine for running software applications.

Cloud computing is generally defined as a form of computing in which dynamic and/or virtualized resources are provided as services over a distributed network of physical computing machines or servers, such as the Internet. Client processes, software applications, and users thereof, are not required to have explicit knowledge or control over the technology infrastructure within the cloud. Instead, they can request or call upon services from the cloud, which are then provided by other providers within the cloud. As such, cloud computing promises software application developers with an easy means way of deploying their application to run simultaneously upon thousands of servers in a cloud.

To date, different solutions of deploying software applications in a cloud have emerged that are generally cloud specific, i.e. the applications need to conform to a cloud/hypervisor specific application program interface (API) to run on their servers. Using this methodology, it is not easy for a cloud customer to migrate an application from one cloud provider to another cloud provider.

Cloud providers can address this problem somewhat by offering hypervisors in their clouds. Generally, a hypervisor acts as a layer between a server's hardware and its operating system. This provides an abstraction layer that allows each physical server to run one or more virtual servers, and effectively decouples the operating system and its applications from the underlying physical server. When used in a cloud, the cloud customer can supply a virtual machine image which contains the customer application to the hypervisor. The image will then be booted in potentially thousands of hypervisors in the cloud. Since there are generally only a few hypervisor types this approach standardizes the format for how the application developer has to package the application. Instead of creating a standalone application that fits into a specific cloud API, the developer now has to create a suitable virtual machine image.

The patent application to U.S. patent application Ser. No. 12/476,103, titled "SYSTEM AND METHOD FOR CONVERTING A JAVA APPLICATION INTO A VIRTUAL SERVER IMAGE FOR CLOUD DEPLOYMENT", filed Jun. 1, 2009, the disclosure of which is hereby incorporated by reference, teaches how to create such a virtual machine image automatically from a Java application. Such a created virtual machine image can be large, depending on the Java application contained therein. The image can also grow in size when the virtual machine image is executed. For example, application generated data and log files can be stored within the image, and such an image can grow to several gigabytes in size.

Since it is usually unavoidable that the Java application or the JVM contained within the virtual machine image will have to be updated there is a need for a tool that can efficiently update such a virtual server image and do so without disturbing the accumulated application data.

In accordance with an embodiment, the system includes a virtual server image updater, that allows the system to take a virtual server image and reconfigure it according to a specification within a virtual server image patch. The reconfigured virtual server image can then be deployed in a hypervisor, or for example within a cloud of hypervisors. In accordance with another embodiment the virtual server image patch is distributed to the computers within a cloud and applied locally on each computer. In another embodiment the Java application is suspended, followed by a shutdown of the virtual server image, the virtual server image is then patched, and finally the virtual server is booted and the Java application resumed.

In accordance with an embodiment, the updater will create an inverse virtual server image patch that, when applied to the reconfigured virtual server image, will restore it to its original state. The virtual server image updater addresses the following problems or features:

Efficiency of updating a virtual server image. The bootable part of the Java virtual machine is significantly smaller than a general purpose operating system. This makes it possible to upgrade both the bootable, and the non-bootable, part of the JVM with a minimal patch file.

Ability to update properties in the bootable part of the JVM, comprising how many cpu's to expose to the non-bootable part of the JVM, as well as the maximum amount of physical ram and disk.

Ability to update the startup arguments for the non-bootable part of the JVM.

Ability to reconfigure the Java application and its startup arguments without disturbing the Java application data and state.

Ability to rewrite the virtual server image from one hypervisor to a different hypervisor without disturbing the Java application data or state.

Ease of use. An administrative person is provided with a tool that works on finished appliances without the need for unpacking, patching and then recreating the appliance.

A typical use of the virtual server image updater would be to take a virtual server image comprising a Weblogic Virtual Edition (VE) installation and reconfigure the virtual server image in such a way that: the Java virtual machine is upgraded to a newer version, both the bootable part and the non-bootable part; the bootable part of the Java virtual machine should use four virtual cpu's; the startup arguments for non-bootable part of the Java virtual machine that later starts Weblogic VE are modified to include a -Xms512M, to set the startup size of the Java heap; and a jar file within the Weblogic installation is replaced with a new jar file, and a configuration file is updated.

```
java -jar updater.jar [patch_file] [virtual_server_image_file]
```

In accordance with an embodiment, a patch file can be created for this setup as:

```
<reconfigure>
    <new-bootable>..Base64 encoded archive...</new-bootable>
    <add-to-bootable-config>-cpu=4</add-to-bootable-config>
    <new-JVM>..Base64 encoded archive...</new-JVM>
    <add-to-jvm-config>-Xms512M</add-to-jvm-config>
    <new-jar-file file="/app/lib/setup.jar">..Base64 encoded jar...
    </new-jar-file>
    <patch file="/app/etc/setup.cfg">..Base64 encoded diff...
    </patch>
</reconfigure>
```

FIG. 1 shows an illustration of a system in accordance with an embodiment of the invention. As shown in FIG. 1, the system includes a computer 102 with a general operating system executing thereon. The computer maintains a virtual server image updater 104, comprising a file system mounter 108, and a modifier 110. The updater works on a virtual server image 112, comprising a bootstrap (or bootsector) configuration 114, and a file system 116. The file system comprises the bootable part of the JVM 118, the non-bootable part of the JVM 120, the software application code 122, and the software application data 124.

In accordance with an embodiment, the modifier 110 reads a virtual server image patch 126 comprising one or more of a new bootable part of the JVM 128, a reconfiguration of the bootable part of the JVM 130, a new non-bootable part of the JVM 132, a reconfiguration of the non-bootable part of the JVM 134, a new software application code 138, and a reconfiguration of the software application 140.

When the updater has performed the changes to the virtual server image as specified by the virtual server image patch, an inverse patch 142 is generated. The inverse patch comprises the previous bootable part of the JVM 144, the previous configuration of the bootable part 146, the previous JVM 148, the previous configuration of the JVM 150, the previous software application code 152, and the previous configuration for the software application 154. If the updater 104 is immediately executed with the inverse image patch 142 on the virtual server image 112, then all the changes are reversed.

Figure 2:
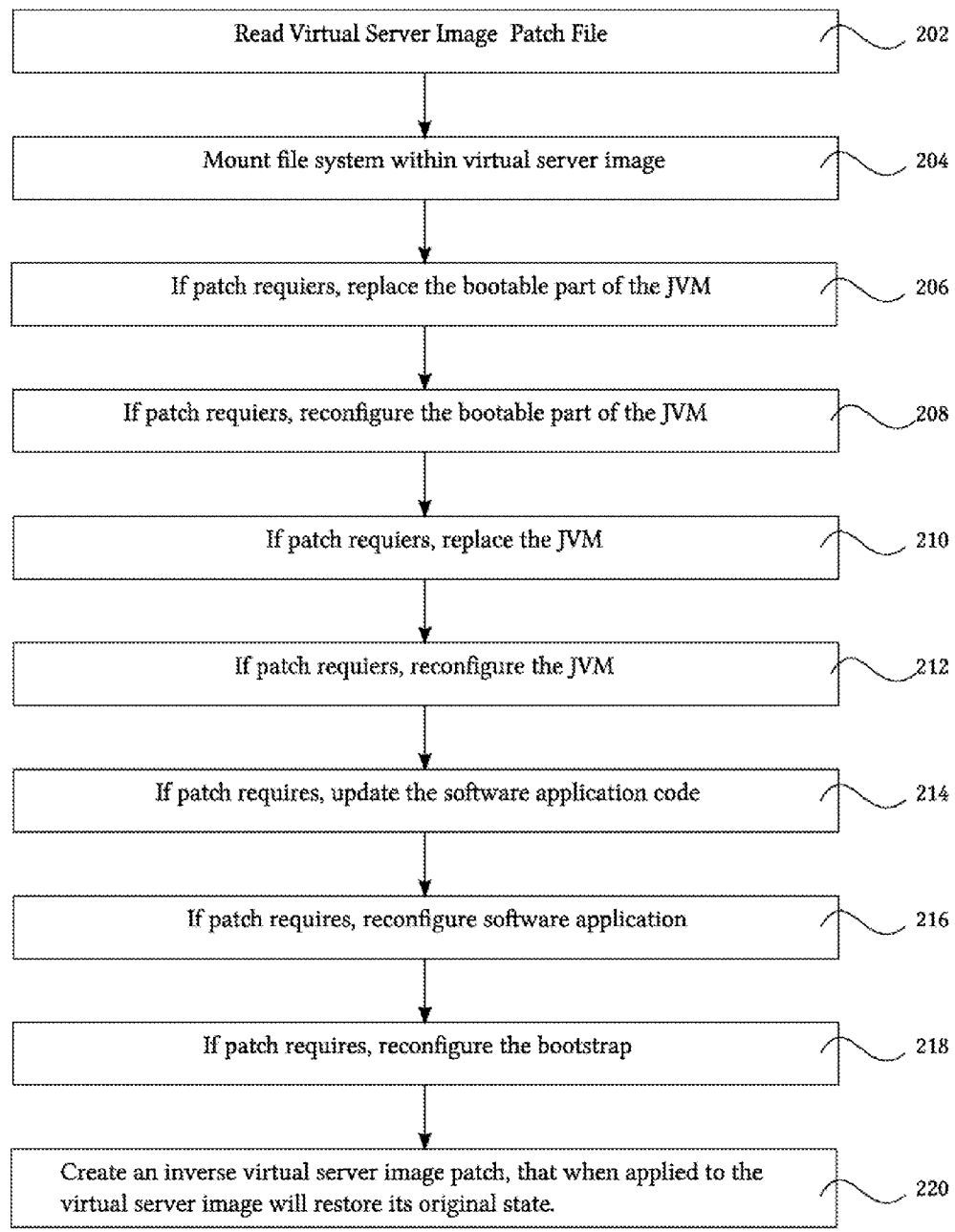
FIG. 2 shows a flowchart of a method in accordance with an embodiment, for reconfiguring a virtual server image.

FIG. 2 shows a flowchart of a method in accordance with an embodiment, for generating a Java virtual machine (JVM) appliance. In accordance with an embodiment, the appliance builder is first started on the system as a standard Java application, such as:

```
java -jar updater.jar [patch_file] [virtual_server_image_file]
```

As shown in FIG. 2, in step 202, the updater reads the patch file, and uses the instructions from the patch file to determine how to reconfigure the virtual server image. In step 204, the updater mounts the file system located within the virtual server image. A file system contained within a file can generally be mounted using operating system tools (usually a loop-back device). The code to read and write the file system can also be implemented in the updater itself. In accordance with an embodiment, the file system is an ext2 file system commonly used in the operating system GNU/Linux, and the ext2 file system read and write, as well as the updater, are implemented in Java.

In step 206, if the patch so requires, the bootable part of the JVM is replaced with the one supplied within the patch. In accordance with an embodiment, the bootable part of the JVM is located within a subdirectory named /baremetal within the file system within the virtual server image. In an embodiment the bootable binary comprises /baremetal/boot.bin. The updater will replace this directory and its contents with the bootable part supplied by the patch. In step 208, if the patch so requires, the bootable part of the JVM is reconfigured, for example by updating the /bm.conf file located within the file system using the specification from the patch file, (in an embodiment using a process similar to how a standard posix tools diff/patch works).

In step 210, if the patch so requires, the non-bootable part of the JVM is replaced (in an embodiment it is located within the subdirectory /jvm) using the same process as the bootable-part of the JVM was replaced. In step 212, the configuration for starting the non-bootable part of the JVM is changed in the same way as the configuration for the bootable part. In accordance with an embodiment the configurations for both the bootable and the non-bootable parts are located within the same /bm.conf file.

In step 214, if the patch so requires the system applies changes to the software application code (in an embodiment located within the directory /application). In step 216, if the patch so requires the system reconfigures the software application in the same way as the previous reconfigurations were performed.

In step 218, if the patch so requires, the bootstrap configuration is updated. For example, for virtual server images compatible with VMWare, the bootstrap configuration is embedded in the bootsector of the virtual server image. For virtual server images compatible with Xen/OracleVM the bootstrap configuration is located within the subdirectory /boot/menu.cfg within the file system within the virtual server image.

In accordance with an embodiment, in step 220, an inverse patch file is generated by the updater. If the inverse patch file is applied to the reconfigured virtual server image, then the original state will be restored. The inverse patch comprises information from the virtual server image (in an embodiment the subdirectory /baremetal), and can therefore not be created before the actual patch is applied to the virtual server image. The other changes are easily calculated from the patch file, for example:

```
add-to-jvm-config
``` is replaced with

```
remove-from-jvm-config
```

Figure 3:
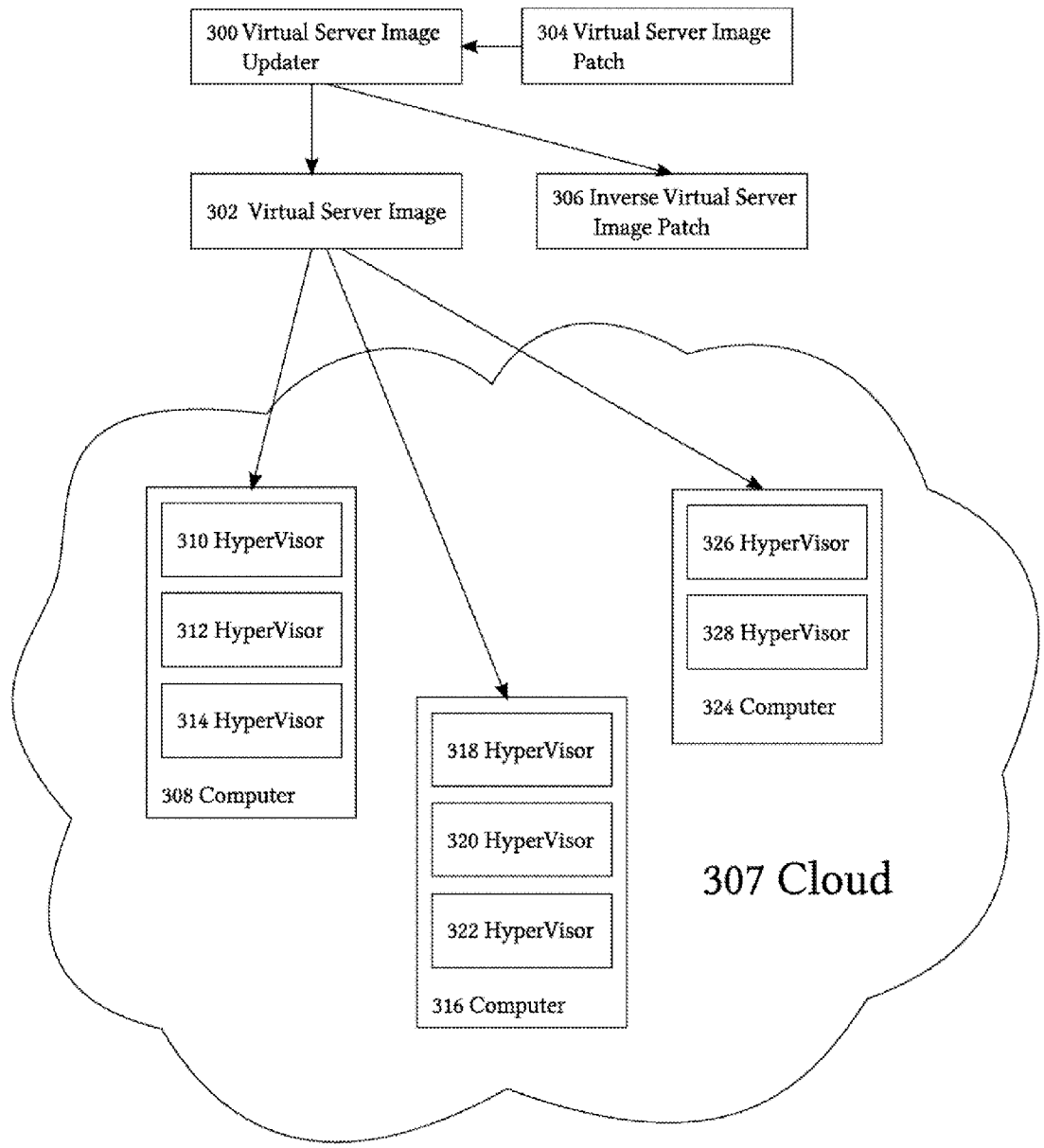
FIG. 3 shows an illustration of how a virtual server image can be reconfigured and then deployed to a cloud, in accordance with an embodiment.

FIG. 3 shows an illustration of how a virtual server image can be reconfigured and then deployed to a cloud, in accordance with an embodiment. As shown in FIG. 3, the virtual server image updater 300 updates a virtual server image to create an updated or reconfigured virtual server image 302, using the virtual server image patch file 304. The virtual server image is as a result updated, and an inverse patch file is generated 306. The inverse patch file is useful if the patched virtual server image misbehaves, or for any other reason the original behavior must be restored. The new virtual server image is then distributed (for example, in an embodiment by using NFS or scp (secure copy)) to one or more computers 308, 316 and 324 in a cloud 307, wherein each of the computers comprises one or more hypervisors 310,312,314,318, 320,322,326,328. The hypervisors then boot the reconfigured virtual server image.

Figure 4:
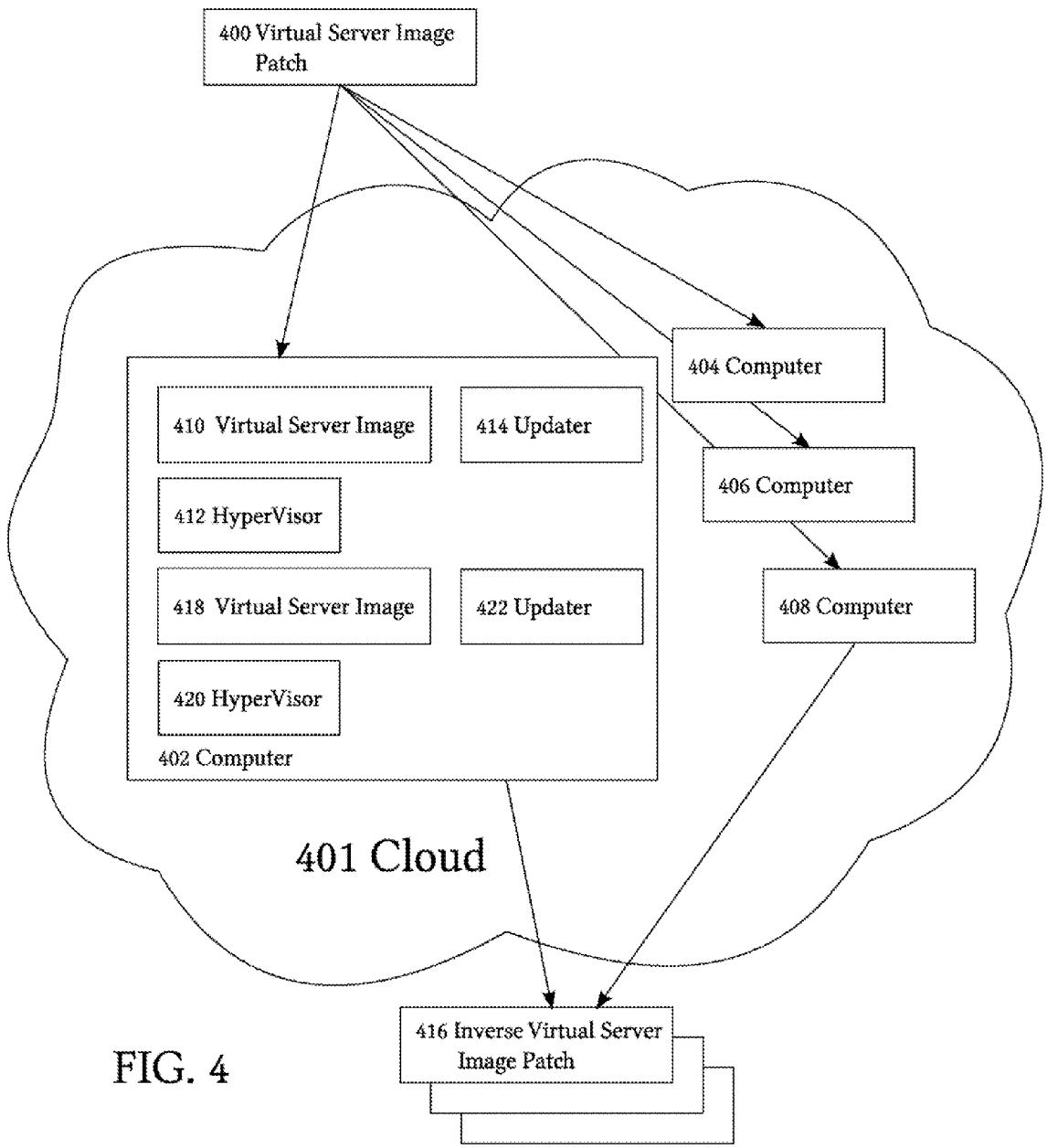
FIG. 4 shows an illustration of how virtual server images already deployed in a cloud can be reconfigured, in accordance with an embodiment.

FIG. 4 shows an illustration of how virtual server images already deployed in a cloud can be reconfigured, in accordance with an embodiment. As shown in FIG. 4, a virtual server image patch file 400 is distributed (again, for example, using NFS or scp (secure copy)) to the computers within a cloud 401. In each of the computers 402,404,406,408 the hypervisors are shut down, and a virtual server image updater 414,422 is run for each virtual server image 410, 418. The hypervisors are then restarted on the updated virtual server images. The generated inverse patch files are collected 416 (again, for example, using NFS or scp (secure copy) or locally at each computer) to be used later, if the patch has to be rolled back. In accordance with an embodiment the updater is part of the hypervisor. In accordance with other embodiments the updater fetches the patch automatically from a patch server.

Figure 5:
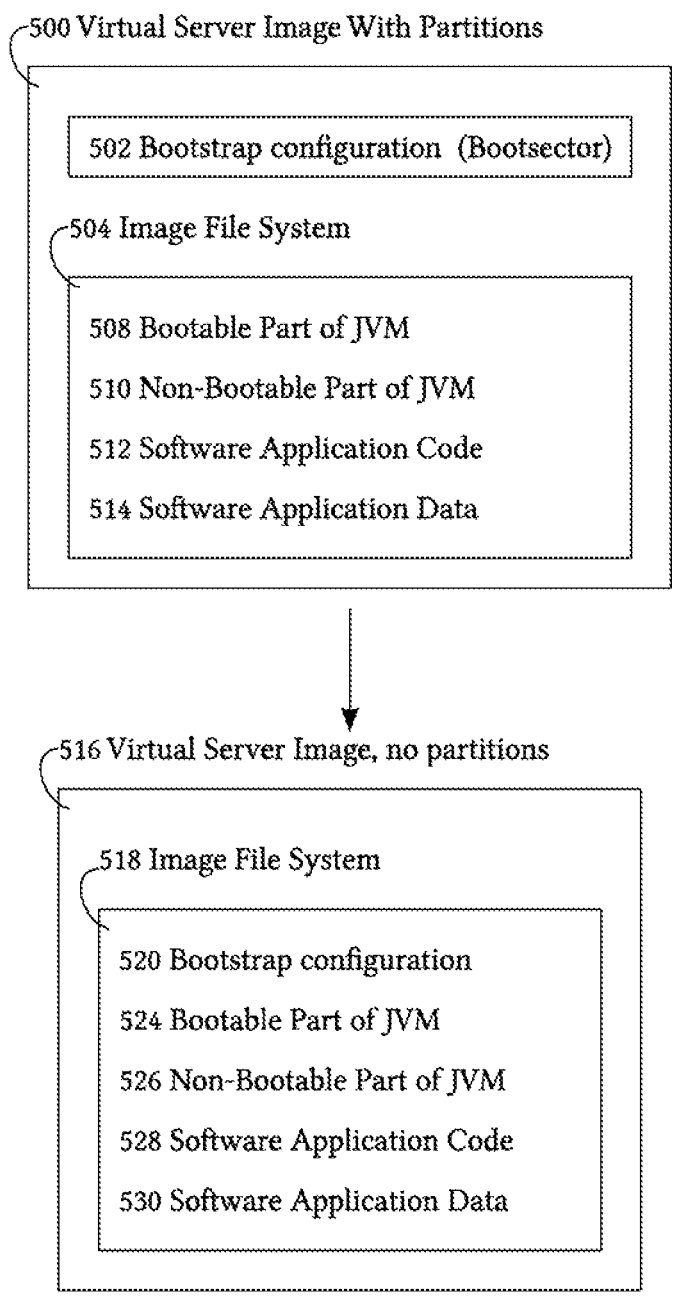
FIG. 5 shows an illustration of how a virtual machine image can be reconfigured from one hypervisor format to a different hypervisor format.

FIG. 5 shows an illustration of how a virtual machine image can be reconfigured from a first hypervisor format to a second or different hypervisor format, in accordance with an embodiment. As shown in FIG. 5, the virtual server image 500 is compatible with a VMWare hypervisor, and therefore the image is formatted as if it was the contents of a hard drive, e.g. it will have partitions and a bootsector 502 in the master boot record. One of the partitions will be the file system 504 comprising the bootable 508 and non-bootable 510 part of the JVM, as well as the software application code 512 and the software application data 514. In accordance with an embodiment, the updater can rewrite this virtual server image into a virtual server image compatible with, e.g. an OracleVM hypervisor 516, by extracting only the partition containing the image file system 518. The new virtual server image contains the copied contents of 508,510,512,514 stored into 524,526,528,530. The boot information embedded in the bootsector that was previously the exact location (head/track/sector) on disk for /baremetal/boot.bin, will instead now be stored as a file name in the bootstrap configuration 520 located within the file system (in an embodiment /boot/menu.cfg).

The above action is provided by way of example. In accordance with various embodiments, the updater is not limited to the above actions, but can also, e.g. resize the appliance to remove excessive virtual server image memory that is not in use, or to increase it for anticipated future use, or other actions. The updater can also record which patches have been applied to the virtual server image (in an embodiment this is recorded in the /patch_history.txt file within the file system within the virtual server image).

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for reconfiguring a virtual server image suitable for cloud deployment, comprising:
a plurality of computers executing within a cloud, each computer including a processor and one or a plurality of hypervisors provided thereon, including a first computer having a first hypervisor, and a second computer having a second hypervisor, wherein the first hypervisor and the second hypervisor are of different type requiring a different bootstrap configuration;
the virtual server image, which can be executed on the one or the plurality of hypervisors, and which provides a virtual machine environment for a software application, wherein the virtual server image contains
a bootable part of a virtual machine,
a non-bootable part of the virtual machine,
a software application code for the software application, and
a software application data for the software application; and
a virtual server image updater used to reconfigure contents of the virtual server image from an original content, where the original content includes a bootstrap configuration required by the first hypervisor, to a reconfigured content where the reconfigured content includes a bootstrap configuration required by the second hypervisor, which receives a virtual server image patch and uses information in the virtual server image patch to reconfigure the contents of the virtual server image from the original content where the original content includes a first configuration of bootable and non-bootable parts, to the reconfigured content where the reconfigured content includes a second configuration of bootable and non-bootable parts, to create a reconfigured virtual server image, including
mounting the virtual server image as a file system that includes a plurality of directories corresponding to the bootable part and non-bootable part of the virtual machine, and the software application code and software application data for the software application,
selectively modifying the file system, while mounted, and as required by the virtual server image patch, to create the reconfigured virtual server image, and
distributing the modified file system as the reconfigured virtual server image, to the one or the plurality of hypervisors for execution thereon, including wherein the virtual server image patch is distributed to the computers within the cloud and applied locally on each computer, further including
suspending a Java application and shutting down the virtual server image,
patching the virtual server image,
booting the virtual server image, and
resuming the Java application.

2. The system of claim 1, wherein during reconfiguration the virtual server image updater also creates an inverse patch which includes one or more of a previous bootable part, a previous configuration of the bootable part, a previous software application code, or a previous configuration for the software application, that can be later used by the virtual server image updater to reverse the reconfigured content of the reconfigured virtual server image, and restore the original content of the virtual server image.

3. The system of claim 1, wherein the virtual server image includes a bootstrap configuration, and an image file system that contains the bootable part of the virtual machine, the non-bootable part of the virtual machine, the software application code for the software application, and the software application data for the software application.

4. The system of claim 3, wherein the bootstrap configuration is stored in the virtual server image separately from the image file system.

5. The system of claim 3, wherein the bootstrap configuration is stored in the virtual server image as part of the image file system.

6. The system of claim 1, wherein each of the plurality of computers includes a plurality of hypervisors, and wherein each of the plurality of hypervisors includes a virtual server image provided thereon.

7. The system of claim 1, wherein if the virtual server image patch so requires, the bootable part of the virtual machine is replaced with one supplied within the patch.

8. A method for reconfiguring a virtual server image suitable for cloud deployment, comprising the steps of:
provinding, at a plurality of computers executing within a cloud, each computer including a processor, and one or a plurality of hypervisors thereon, including a first computer having a first hypervisor, and a second computer having a second hypervisor, wherein the first hypervisor and the second hypervisor are of different type requiring a different bootstrap configuration, the virtual server image, which can be executed on the one or the plurality of hypervisors, and which provides a virtual machine environment for a software application, wherein the virtual server image contains
a bootable part of a virtual machine,
a non-bootable part of the virtual machine,
a software application code for the software application, and
a software application data for the software application; and
receiving, at a virtual server image updater used to reconfigure the contents of the virtual server image from an original content, where the original content includes a bootstrap configuration required by the first hypervisor, to a reconfigured content where the reconfigured content includes a bootstrap configuration required by the second hypervisor, a virtual server image patch, and using information in the virtual server image patch to reconfigure the contents of the virtual server image from the original content where the original content includes a first configuration of bootable and non-bootable parts, to the reconfigured content where the reconfigured content includes a second configuration of bootable and non-bootable parts, to create a reconfigured virtual server image, including
mounting the virtual server image as a file system that includes a plurality of directories corresponding to the bootable part and non-bootable part of the virtual machine, and the software application code and software application data for the software application,
selectively modifying the file system, while mounted, and as required by the virtual server image patch, to create the reconfigured virtual server image, and
distributing the modified file system as the reconfigured virtual server image, to the one or the plurality of hypervisors for execution thereon, including wherein the virtual server image patch is distributed to the computers within the cloud and applied locally on each computer, further including
suspending a Java application and shutting down the virtual server image,
patching the virtual server image,
booting the virtual server image, and
resuming the Java application.

9. The method of claim 8, wherein during reconfiguration the virtual server image updater also creates an inverse patch which includes one or more of a previous bootable part, a previous configuration of the bootable part, a previous software application code, or a previous configuration for the software application, that can be later used by the virtual server image updater to reverse the reconfigured content of the reconfigured virtual server image, and restore the original content of the virtual server image.

10. The method of claim 8, wherein the virtual server image includes a bootstrap configuration, and an image file system that contains the bootable part of the virtual machine, the non-bootable part of the virtual machine, the software application code for the software application, and the software application data for the software application.

11. The method of claim 10, wherein the bootstrap configuration is stored in the virtual server image separately from the image file system.

12. The method of claim 10, wherein the bootstrap configuration is stored in the virtual server image as part of the image file system.

13. The method of claim 8, wherein each of the plurality of computers includes a plurality of hypervisors, and wherein each of the plurality of hypervisors includes a virtual server image provided thereon.

14. The method of claim 8, wherein if the virtual server image patch so requires, the bootable part of the virtual machine is replaced with one supplied within the patch.

15. A non-transitory computer readable medium including instructions stored thereon which when read and executed by the computer cause the computer to perform the steps comprising:
providing, at a plurality of computers executing within a cloud, each computer including a processor, and one or a plurality of hypervisors thereon, including a first computer having a first hypervisor, and a second computer having a second hypervisor, wherein the first hypervisor and the second hypervisor are of different type requiring a different bootstrap configuration, a virtual server image, which can be executed on the one or the plurality of hypervisors, and which provides a virtual machine environment for a software application, wherein the virtual server image contains
a bootable part of a virtual machine,
a non-bootable part of the virtual machine,
a software application code for the software application, and
a software application data for the software application; and
receiving, at a virtual server image updater used to reconfigure the contents of the virtual server image from an original content, where the original content includes a bootstrap configuration required by the first hypervisor, to a reconfigured content where the reconfigured content includes a bootstrap configuration required by the second hypervisor, a virtual server image patch, and using information in the virtual server image patch to reconfigure the contents of the virtual server image from the original content where the original content includes a first configuration of bootable and non-bootable parts, to the reconfigured content where the reconfigured content includes a second configuration of bootable and non-bootable parts, to create a reconfigured virtual server image, including
mounting the virtual server image as a file system that includes a plurality of directories corresponding to the bootable part and non-bootable part of the virtual machine, and the software application code and software application data for the software application, selectively modifying the file system, while mounted, and as required by the virtual server image patch, to create the reconfigured virtual server image, and distributing the modified file system as the reconfigured virtual server image, to the one or the plurality of hypervisors for execution thereon, including wherein the virtual server image patch is distributed to the computers within the cloud and applied locally on each computer, further including suspending a Java application and shutting down the virtual server image, patching the virtual server image, booting the virtual server image, and resuming the Java application.

\* \* \* \* \*

UNITED STATES PATENT AND TRADEMARK OFFICE
CERTIFICATE OF CORRECTION

| | | |
|---|---|---|
| PATENT NO. | : 8,776,053 B2 | Page 1 of 1 |
| APPLICATION NO. | : 12/853053 | |
| DATED | : July 8, 2014 | |
| INVENTOR(S) | : Lagergren et al. | |

It is certified that error appears in the above-identified patent and that said Letters Patent is hereby corrected as shown below:

In the Drawings:

On sheet 2 of 5, in figure 2, under Referral Numeral 206, line 1, delete "requiers," and insert -- requires, --, therefor.

On sheet 2 of 5, in figure 2, under Referral Numeral 208, line 1, delete "requiers," and insert -- requires, --, therefor.

On sheet 2 of 5, in figure 2, under Referral Numeral 210, line 1, delete "requiers," and insert -- requires, --, therefor.

On sheet 2 of 5, in figure 2, under Referral Numeral 212, line 1, delete "requiers," and insert -- requires, --, therefor.

Signed and Sealed this
Twenty-fourth Day of February, 2015

Michelle K. Lee
*Deputy Director of the United States Patent and Trademark Office*